May 1, 1945.  W. P. WILLS  2,375,158
MEASURING APPARATUS
Filed Dec. 1, 1941
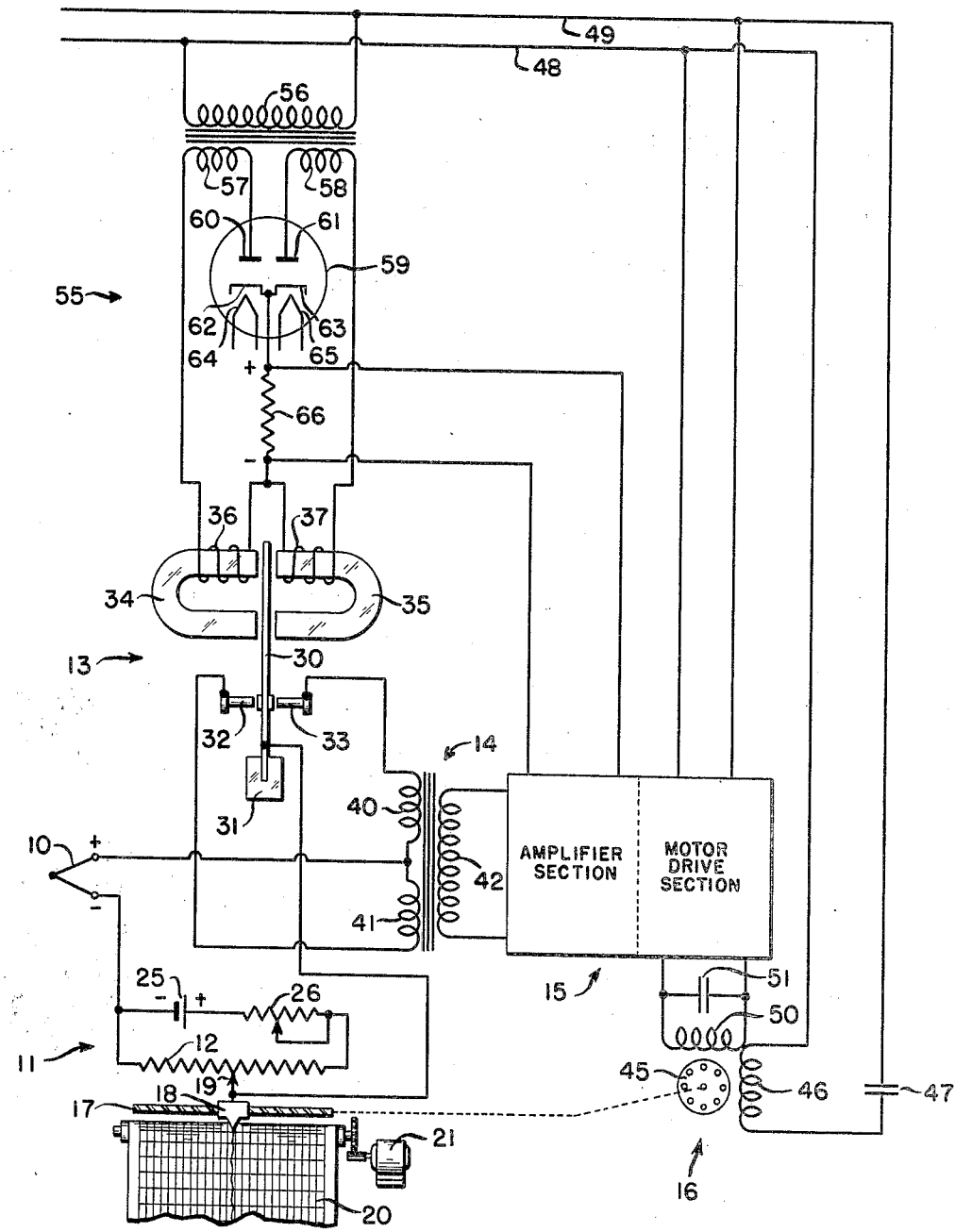
INVENTOR.
WALTER P. WILLS
BY C. B. Spangenberg
ATTORNEY.

Patented May 1, 1945

2,375,158

UNITED STATES PATENT OFFICE 2,375,158

MEASURING APPARATUS

Walter P. Willis, Philadelphia, Pa., assignor to The Brown Instrument Company, Philadelphia, Pa., a corporation of Pennsylvania Application December 1, 1941, Serial No. 421,174

12 Claims. (Cl. 172—239)

This invention relates to a measuring apparatus for measuring the value of a condition.

More specifically, this invention is directed to a self-balancing potentiometer measuring apparatus of the type shown and described in my copending application, Serial Number 421,173, filed Dec. 1, 1941, wherein the unbalanced D. C. or steady current of the potentiomeer is transformed into a fluctuating current of one phase or of opposite phase depending upon the sense of unbalance of the potentiometer circuit, wherein the fluctuating current is amplified and applied to a reversible electric motor which is also supplied with a fluctuating or alternating current from a power source, wherein the application of the two fluctuating currents causes operation of the reversible electric motor in one direction or the other depending upon the phase of the amplified fluctuating current with respect to the phase of the fluctuating current from the power source, and wherein operation of the reversible electric motor rebalances the potentiometer circuit and also operates exhibiting apparatus such as recording mechanism.

The transforming of the unbalanced D. C. or steady current of the potentiometer to a fluctuating current may be accomplished by a vibrator, such as a vibrating switching mechanism or vibrating microphone apparatus or equivalent arrangements. In order to obtain proper phasing of this fluctuating current wtih respect to the phase of the fluctuating or alternating current supplied to the reversible electric motor from the external source to operate the reversible electric motor in the correct direction to rebalance the potentiometer circuit, some means must be provided to synchronize the vibrator with the external source.

Accordingly, a main object of this invention is to provide a new and novel arrangement for synchronizing a vibrator with respect to a source of fluctuating current.

A further object of this invention is to provide an improved arrangement for positively driving the vibrator in both directions to insure proper operation of the vibrator.

Another object is to provide a rectifier arrangement for operating a vibrator in a positive and synchronous manner.

Still another object is to utilize the rectifier arrangement, which operates the vibrator, as a source of relatively steady current for the amplifier which amplifies the fluctuating currents produced by the vibrator.

Other objects and advantages will become apparent to those skilled in the art upon reference to the accompanying specification, claims and drawing in which is schematically illustrated the preferred form of this invention.

Referring now to the drawing 10 designates a thermocouple responding to a condition such as a temperature condition within a furnace and which produces a D. C. or steady potential which corresponds directly with the temperature condition existing within the furnace. This D. C. potential produced by the thermocouple 10 is opposed by a D. C. or steady potential produced by a potentiometer circuit arrangement designated generally at 11 and including a slidewire 12.

The differential D. C. or steady current produced by these opposed steady potentials is controlled by a vibrator generally designated at 13 and is applied to a transformer 14 to produce a fluctuating or alternating potential across the secondary winding of the transformer 14 which is of one phase or of opposte phase depending upon the direction of unbalance of the potentiometer circuit. This fluctuating or alternating potential across the secondary of the transformer 14 is amplified by an amplifier generally designated at 15 and the current output of the amplifier 15 is applied to a reversible electric motor generally designated at 16. The electric motor 16 may operate a screw threaded shaft 17 for moving longitudinally thereof a pen carriage 18. The pen carriage 18 operates a contact 19 with respect to the slidewire 12 and also positions a pen with respect to a chart 20 driven by a synchronous motor 21. The pen carriage 18 assumes a position corresponding to the temperature condition existing within the furnace and to which the thermocouple 10 responds to record on the chart 20 the temperature condition existing within the furnace.

The potentiometer circuit arrangement includes a battery 25 and a standardizing resistance 26 for placing a D. C. or steady potential across the slidewire 12 which is in opposition to the D. C. or steady potential produced by the thermocouple 10. When the contact 19 is moved to the right as shown in the drawing the potential at contact 19 is increased and when the contact 19 is moved to the left the potential at the contact 19 is decreased.

The vibrator 13 includes a vibrating reed or armature 30 carried by a support 31. When the reed is moved to the left as viewed in the drawing, it engages a contact 32, and when it moves to the right it engages a contact 33. The movement of the vibrating reed 30 is controlled by iron cores 34 and 35 on which are mounted coils 36 and 37, respectively. When the coil 36 is energized a flow of flux is produced in the core 34 to attract the reed 30 to the left to cause the reed 30 to engage the contact 32. When the coil 37 is energized a flow of flux is produced in the core 35 to attrack the reed 32 to the right into engagement with the contact 33.

The transformer 14 includes a pair of primary windings 40 and 41 and a secondary winding 42, the secondary winding 42 being connected to the amplifier section of the amplifier 15. The upper end of the primary winding 40 is connected to to the contact 33, and the lower end of the primary winding 41 is connected to the contact 32. The adjacent ends of the primary windings 40 and 41 are connected to the positive element of the thermocouple 10. The negative element of the thermocouple 10 is connected to the left end of the slidewire 12 and the contact 19 engaging the slidewire 12 is connected to the vibrating reed 30.

The reversible electric motor is shown to be a rotating field type motor having a rotor 45 provided with conductor bars and a power winding 46 serially connected with a condenser 47 across line wires 48 and 49 leading from some source of alternating or fluctuating potential, not shown. The condenser 47 is so selected with respect to the field winding 46 as to produce a nearly resonant circuit to cause the current flow through the power winding 46 to be approximately in phase with the alternating potential of the line wires 48 and 49 while permitting the alternating voltage across the power winding 46 to lead the current by substantially 90°. The reversible electric motor 16 also includes a control winding 50 connected to the motor drive section of the amplifier 15. A condenser 51 is connected in parallel with the control winding 50 to provide a resonant circuit so that the alternating or fluctuating potential across the control winding 50 leads the current through the control winding 50 by substantially 90°. Power is supplied to the motor drive section of the amplifier from the line wires 48 and 49. Since the details of the amplifier 15 are shown in my copending application a further description in this application is not considered necessary.

A rectifier arrangement for operating the vibrator 13 is generally designated at 55. This rectifier arrangement includes a transformer having a primary winding 56 connected across line wires 48 and 49 and a pair of secondary windings 57 and 58. The rectifier arrangement also includes a rectifier tube 59 having a pair of plates 60 and 61, a pair of cathodes 62 and 63 and a pair of cathode heaters 64 and 65. The cathode heaters 64 and 65 may be supplied with energy from any suitable source, not shown. The plate 60 is connected to the right end of the transformer secondary winding 57 and the left end of the transformer secondary winding 57 is connected to the left end of the coil 36 of the vibrator. The plate 61 is connected to the left end of the transformer secondary winding 58 and the right end thereof is connected to the right end of the coil 37 of the vibrator 13. The adjacent ends of coils 36 and 37 are connected together and through a resistance 66 to the cathodes 62 and 63 of the tube 59.

The rectifier arrangement of 55 is, therefore, a full wave rectifier for producing a substantially steady D. C. potential across the resistance 66 which may be utilized for supplying D. C. current to the amplifier section of the amplifier 15, the ends of the resistance 66 being connected to the amplifier section for this purpose.

Assume now that during the first half cycle of the alternating potential applied to the line wires 48 and 49 the potential of the wire 48 is positive with respect to the potential of the wire 49. Assume also that during the first half cycle the left ends of the transformer secondary windings 57 and 58 are positive. Current will then flow from the left end of the secondary winding 58 through plate 61, cathode 63, resistance 66 and coil 37 back to the right end of the secondary winding 58. This moves the vibrating reed 30 to the right to cause the vibrating reed 30 to engage the contact 33. During the first half cycle no current flows through the coil 36 of the vibrator 13 so that the vibrating reed 30 is positively attracted to the right to engage the contact 33. Also, during the first half cycle the current flow through the power winding 46 of the reversible electric motor 16 is downward.

During the second half cycle the potential of the line wire 48 is negative with respect to that of the line wire 49 and, therefore, the right ends of the transformer secondaries 57 and 58 are positive. During the second half cycle current flows from the right end of the secondary 57 through the plate 60, cathode 62, resistance 66 and coil 36 back to the left end of the secondary 57. This causes the vibrating reed 30 to be attracted to the left to cause the vibrating reed 30 to engage the contact 32. During the second half cycle no current flows through the coil 37 and, therefore, the vibrating reed 30 is positively attracted into engagement with contact 32. Also during the second half cycle the current flow through the power winding 46 is upward.

When the potentiometer circuit is balanced, that is, when the contact 19 is at a position corresponding to the value of the temperature condition within the furnace so that the potential of the contact 19 is equal to that of the positive element of the thermocouple 10, no current flows in the potentiometer circuit and, therefore, no fluctuating or alternating potential is produced across the secondary 42 of the transformer 14. Under these conditions the current flow through the control winding 50 of the reversible electric motor 16 is relatively uniform and the reversible electric motor 16 remains stationary.

Assume now that the temperature within the furnace increases to cause the potential of the positive element of the thermocouple 10 to increase above that of the contact 19. During the first half cycle of the alternating source, this unbalanced current will flow upwardly through the primary winding 40 and through contact 33 and vibrating reed 30 to cause the upper end of the secondary 42 of the transformer 14 to be positive with respect to the lower end. During the second half cycle this unbalanced current will flow downwardly through the transformer primary 41 and through contact 32 and vibrating reed 30 to cause the upper end of the secondary 42 to become negative with respect to the lower end. Accordingly, a fluctuating or alternating potential is produced across the secondary 42 to cause the potential of the upper end of the secondary 42 to fluctuate in phase with the line voltage across the line wires 48 and 49. This fluctuating or alternating potential across the secondary winding 42 is amplified in the amplifier section of the amplifier 15 and controls the motor drive section thereof to produce an alternating or fluctuating current flow in the control winding 50 which leads the current flow through the power winding 46 by substantially 90°. This causes rotation of the reversible electric motor 16 in a direction to move the contact 19 to the right. When the contact 19 is moved sufficiently far to the right so that the potential thereof corresponds to the potential of the positive element of the thermocouple 10, the potentiometer circuit becomes balanced and rotation of the reversible electric motor 16 is stopped. The contact 19 and the pen carriage 18, therefore, assume a position which is representative of the temperature condition then existing within the furnace.

Assume now that the temperature within the furnace decreases so that the potential of the positive element of the thermocouple 10 becomes less than the potential of the contact 19. During the first half cycle current flows through the vibrating reed 30 and contact 33 downwardly through the primary 40 to cause the upper end of the secondary 42 to be negative with respect to the lower end. During the second half cycle current flows through the vibrating reed 30 and contact 32 and upwardly through primary winding 41 to cause the upper end of the secondary winding 42 to be positive with respect to the lower end. Accordingly an alternating or fluctuating potential is produced across the secondary winding 42 to cause the potential of the upper end of the secondary winding 42 to alternate or fluctuate 180° out of phase with the alternation of line wires 48 and 49. This alternating or fluctuating potential across the secondary 42 is amplified in the amplifying section of the amplifier to control the motor drive section thereof to produce a current flow through the control winding 50 of the reversible motor 16 which lags the current flow through the power winding 46 by substantially 90°. This causes the reversible motor 16 to operate in the opposite direction to move the contact 19 to the left to decrease the potential thereof. When the contact 19 is moved sufficiently far to the left so that the potential thereof corresponds to the potential of the positive element of the thermocouple 10 the potentiometer circuit becomes balanced and operation of the reversible electric motor 16 is stopped.

From the above it is seen that the vibrator 13 controlled by the rectifier arrangement 55 produces an alternating or fluctuating potential at the secondary of the transformer 14 which is of one phase or of opposite phase depending upon the direction of unbalance of the potentiometer circuit and which alternating potential is utilized for operating the reversible motor 16 in one direction or the other to rebalance the potentiometer circuit. By reason of the vibrator 13 and the rectifier arrangement 55 outlined above, the alternating or fluctuating potential applied to the amplifier 15 is always of the correct phase to cause operation of the reversible electric motor 16 in the correct direction. The vibrating reed 30 of the vibrator 13 is positively moved in both directions into engagement with either contact 32 or 33 to assure proper operation of the vibrator. The rectifier arrangement 55 in addition to positively controlling the vibrator 13 also supplies a relatively steady current to the amplifier section of the amplifier 15 for amplifying the pulsating current supplied to the amplifier by the transformer 14.

While in accordance with the provision of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In combination, a source of alternating potential, a source of steady potential, and means for producing a fluctuating potential derived from the steady potential and in desired phase relation with the alternating potential including a movable device, a first rectifier, means connected with the source of alternating potential and the first rectifier for moving the device positively in one direction during one half cycle of the alternating potential, a second rectifier and means connected with the source of alternating potential and the second rectifier for moving the device positively in the opposite direction during the other half cycle of the alternating potential.

2. In combination, a source of alternating potential, means for producing a steady potential of one polarity or of opposite polarity, and means for producing a fluctuating potential derived from the steady potential and of one phase or of opposite phase depending upon the polarity of the steady potential and in desired phase relation with the alternating potential including a movable device, a rectifier, means connected with the source of alternating potential and the rectifier for moving the device in one direction during one half cycle of the alternating potential and means for moving the device in the opposite direction.

3. In combination, a source of alternating potential, means for producing a steady potential of one polarity or of opposite polarity, means for producing a fluctuating potential derived from the steady potential and of one phase or of opposite phase depending upon the polarity of the steady potential and in desired phase relation with the alternating potential including a movable device, a first rectifier, means connected with the source of alternating potential and the first rectifier for moving the device in one direction during one half cycle of the alternating potential, a second rectifier and means connected with the source of alternating potential and the second rectifier for moving the device positively in the opposite direction during the other half cycle of the alternating potential.

4. In combination, a source of alternating potential, self-balancing circuit means including means responsive to a condition for unbalancing the circuit means to produce a steady potential of one polarity or of opposite polarity dependent upon the direction of unbalance and means for rebalancing the circuit means to reduce the steady potential, means for producing a fluctuating potential derived from the steady potential and of one phase or of opposite phase depending upon the polarity of the steady potential and in desired phase relation with the alternating potential including a movable device which when moved in synchronism with the alternations of said source of alternating current is operative to derive such a fluctuating potential from said steady potential, a rectifier, means connected with the source of alternating potential and the rectifier for moving the device in one direction during one half cycle of the alternating potential and means for moving the device in the opposite direction, and means controlled by the fluctuating potential and the alternating potential for controlling the rebalancing means.

5. In combination, a source of alternating potential, self-balancing circuit means including means responsive to a condition for unbalancing the circuit means to produce a steady potential of one polarity or of opposite polarity dependent upon the direction of unbalance and means for rebalancing the circuit means to reduce the steady potential, means for producing a fluctuating potential derived from the steady potential and of one phase or of opposite phase depending upon the polarity of the steady potential and in desired phase relation with the alternating potential including a movable device which when moved in synchronism with the alternations of said source of alternating current is operative to derive such a fluctuating potential from said steady potential, a first rectifier, means connected with the source of alternating potential and the first rectifier for moving the device positively in one direction during one half cycle of the alternating potential, a second rectifier and means connected with the source of alternating potential and the second rectifier for moving the device positively in the opposite direction during the other half cycle of the alternating potential, and means controlled by the fluctuating potential and the alternating potential for controlling the rebalancing means.

6. In combination, a source of alternating potential, a source of steady potential, and means for producing a fluctuating potential derived from the steady potential and in desired phase relation with the alternating potential including a movable device, a full wave rectifier connected to the source of alternating potential and means connected in opposite legs of the full wave rectifier for positively moving the device alternately in opposite directions in synchronism with the alternations of the source of alternating potential.

7. In combination, a source of alternating potential, a source of steady potential, means for producing a fluctuating potential derived from the steady potential and in desired phase relation with the alternating potential including a movable device, a full wave rectifier connected to the source of alternating potential and means connected in opposite legs of the full wave rectifier for positively moving the device alternately in opposite directions in synchronism with the alternations of the source of alternating potential, an electronic amplifier controlled by the fluctuating potential, and means connected with the full wave rectifier for applying a steady potential to the electronic amplifier for amplifying the fluctuating potential.

8. In combination, a source of alternating potential, means for producing a steady potential of one polarity or of opposite polarity, and means for producing a fluctuating potential derived from the steady potential and of one phase or of opposite phase depending upon the polarity of the steady potential and in desired phase relation with the alternating potential including a movable device, a full wave rectifier connected with the source of alternating potential and means connected in opposite legs of the full wave rectifier for positively moving the device alternately in opposite directions in synchronism with the alternations of the source of alternating potential.

9. In combination, a source of alternating potential, means for producing a steady potential of one polarity or of opposite polarity, means for producing a fluctuating potential derived from the steady potential and of one phase or of opposite phase depending upon the polarity of the steady potential and in desired phase relation with the alternating potential including a movable device, a full wave rectifier connected with the source of alternating potential and means connected in opposite legs of the full wave rectifier for positively moving the device alternately in opposite directions in synchronism with the alternations of the source of alternating potential, an electronic amplifier controlled by the fluctuating potential, and means connected with the full wave rectifier for applying a steady potential to the electronic amplifier for amplifying the fluctuating potential.

10. In combination, a source of alternating potential, self-balancing circuit means including means responsive to a condition for unbalancing the circuit means to produce a steady potential of one polarity or of opposite polarity dependent upon the direction of unbalance and means for rebalancing the circuit means to reduce the steady potential, means for producing a fluctuating potential derived from the steady potential and of one phase or of opposite phase depending upon the polarity of the steady potential and in desired phase relation with the alternating potential including a movable device which when moved in synchronism with the alternations of said source of alternating current is operative to derive such a fluctuating potential from said steady potential, a full wave rectifier connected to the source of alternating potential and means connected in opposite legs of the full wave rectifier for positively moving the device alternately in opposite directions in synchronism with the alternations of the source of alternating potential, and means controlled by the fluctuating potential and the alternating potential for controlling the rebalancing means.

11. In combination, a source of alternating potential, self-balancing circuit means including means responsive to a condition for unbalancing the circuit means to produce a steady potential of one polarity or of opposite polarity depending upon the direction of unbalance and means for rebalancing the circuit means to reduce the steady potential, means for producing a fluctuating potential derived from the steady potential and of one phase or of opposite phase depending upon the polarity of the steady potential and in desired phase relation with the alternating potential including a movable device which when moved in synchronism with the alternations of said source of alternating current is operative to derive such a fluctuating potential from said steady potential, a full wave rectifier connected to the source of alternating potential and means connected in opposite legs of the full wave rectifier for positively moving the device alternately in opposite directions in synchronism with the alternations of the source of alternating potential, an electronic amplifier controlled by the fluctuating potential, means connected with the full wave rectifier for applying a steady potential to the electronic amplifier for amplifying the fluctuating potential, and means controlled by the amplified fluctuating potential and the alternating potential for controlling the rebalancing means.

12. In combination, a source of alternating potential, a movable device, a full wave rectifier circuit comprising a transformer having a primary winding connected to said source of alternating potential and having a pair of secondary windings, a first rectifier, a resistance, a circuit including said resistance, one of said transformer secondary windings, said first rectifier so arranged as to be conductive on one half cycle of said alternating potential and means to positively move said device in one direction, a second rectifier, and a circuit including said resistance, the other of said transformer secondary windings, said second rectifier so arranged as to be conductive on the other half cycle of said alternating potential and means to positively move said device in the opposite direction, said resistance being so connected in both of said circuits that the current flow therethrough is always in the same direction.

WALTER P. WILLS.